(12) United States Patent
Mucciaccciaro et al.

(10) Patent No.: US 6,203,239 B1
(45) Date of Patent: Mar. 20, 2001

(54) WEDGE PLUG TUBING CONNECTOR

(75) Inventors: Domenic Mucciaccciaro, Boca Raton; Alvin S. Blum, Fort Lauderdale, both of FL (US)

(73) Assignee: Domenic Mucciacciaro, Deerfield Beach, FL (US)

( * ) Notice: Subject to any disclaimer, the term of this patent is extended or adjusted under 35 U.S.C. 154(b) by 0 days.

(21) Appl. No.: 09/487,452

(22) Filed: Jan. 19, 2000

(51) Int. Cl.[7] ............................................. B25G 3/20
(52) U.S. Cl. ................. 403/374.4; 403/256; 403/297; 256/65
(58) Field of Search ......................... 403/170, 196, 403/240, 248, 256, 258, 294, 297, 252, 374.4; 256/65; 312/265.1, 265.4, 140

(56) References Cited

U.S. PATENT DOCUMENTS

| 2,557,766 | 6/1951 | Ronfeldt. | |
|---|---|---|---|
| 2,611,633 | 9/1952 | Webster. | |
| 3,198,562 | * 8/1965 | Smith | 403/374.4 X |
| 3,274,744 | * 9/1966 | Blum et al. | 256/65 X |
| 3,511,477 | * 5/1970 | Seery | 256/65 |
| 3,528,691 | * 9/1970 | Matich, Jr. | 403/374.4 X |
| 3,609,930 | * 10/1971 | Crandal | 52/245 |
| 3,695,649 | * 10/1972 | Laverone | 403/374.4 X |
| 3,850,534 | 11/1974 | O'Halloran | 403/190 |
| 3,867,048 | 2/1975 | Endzweig | 403/252 |
| 3,962,774 | 6/1976 | Noro | 29/432 |
| 3,989,282 | 11/1976 | Zimmerman | 285/222 |
| 4,508,321 | 4/1985 | Morimoto | 256/65 |
| 5,090,924 | * 2/1992 | Pfaller et al. | 403/374.4 X |
| 5,213,006 | * 5/1993 | Liao | 403/374.4 X |
| 5,232,304 | * 8/1993 | Huang | 403/374.4 |
| 5,244,186 | * 9/1993 | Chandler | 256/65 |
| 5,464,299 | * 11/1995 | Scharer et al. | 403/297 |

FOREIGN PATENT DOCUMENTS

2448065 * 10/1980 (FR) ..................................... 403/258

* cited by examiner

Primary Examiner—Lynne H. Browne
Assistant Examiner—David E. Bochna
(74) Attorney, Agent, or Firm—Alvin S. Blum

(57) ABSTRACT

A joint connects one end of a tube to the side of a hollow member. It employs a pair of wedge elements that have sloping sides. A threaded fastener passes freely through a proximal wedge and then is threaded through a distal wedge. The fastener first passes through a hole in the side of the member and the wedges are inserted into the end of the tube. Tightening the fastener draws the wedges toward the member and causes the wedges to cooperate with one another to grip the inner surfaces of the tube to create a strong joint stable in many directions. Joints shown for tubes with various shapes.

21 Claims, 4 Drawing Sheets

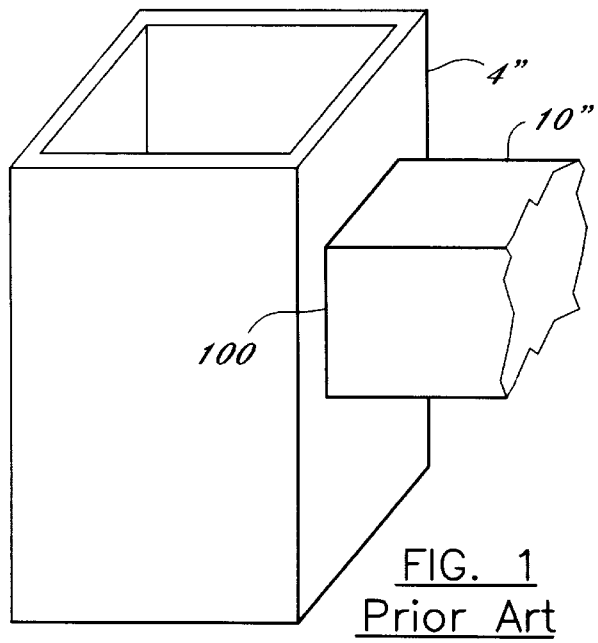
FIG. 1
Prior Art
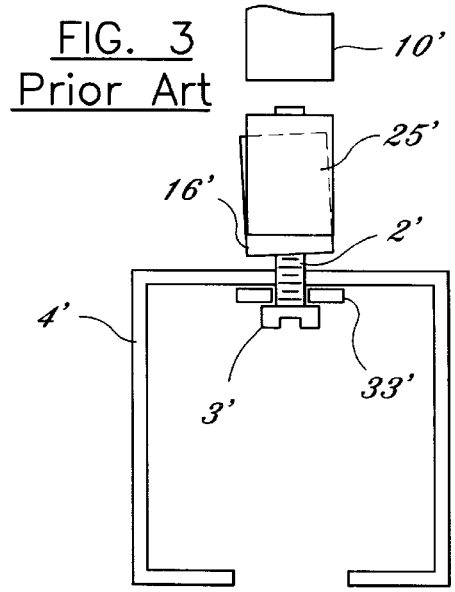
FIG. 3
Prior Art
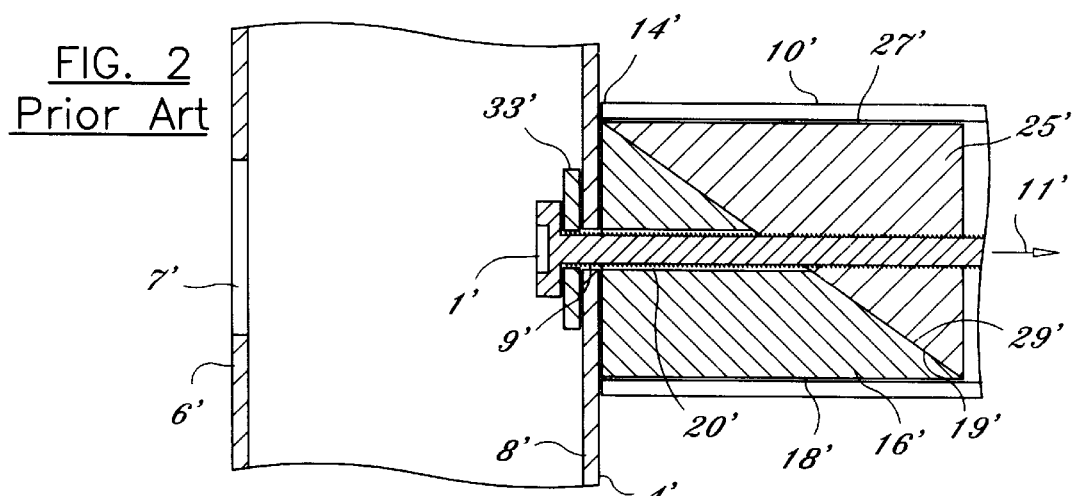
FIG. 2
Prior Art
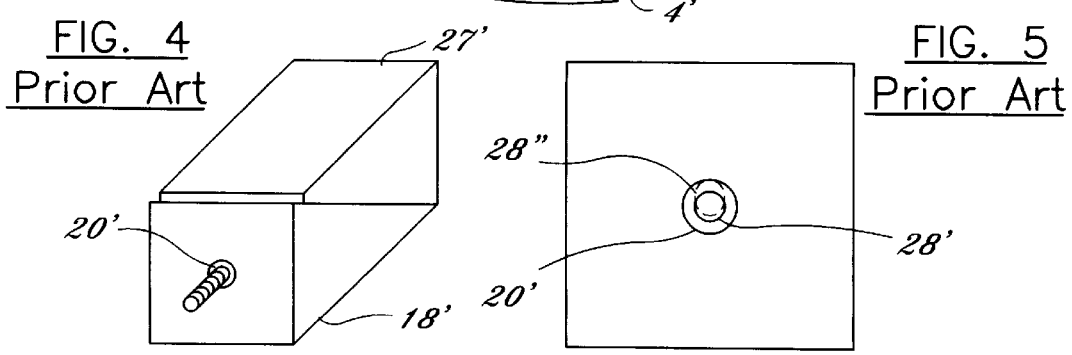
FIG. 4
Prior Art
FIG. 5
Prior Art

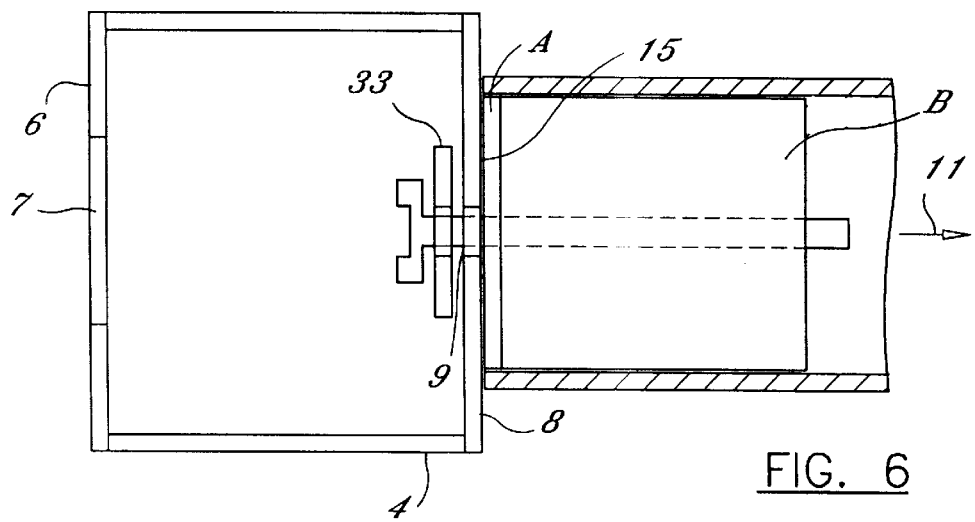
FIG. 6
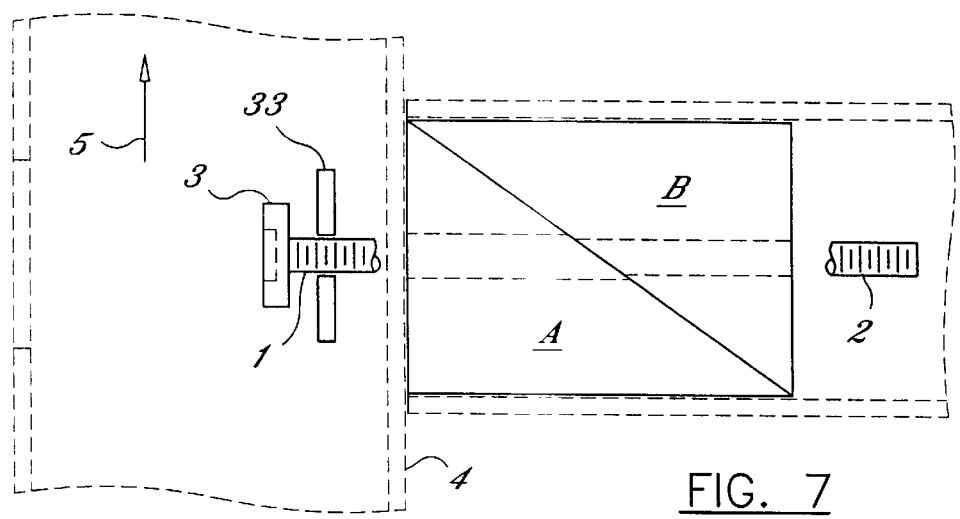
FIG. 7
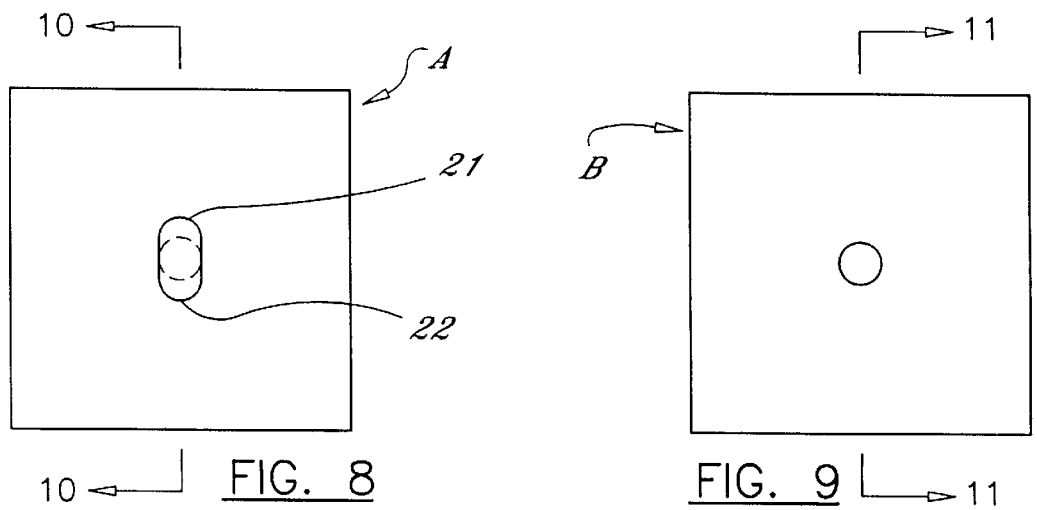
FIG. 8
FIG. 9

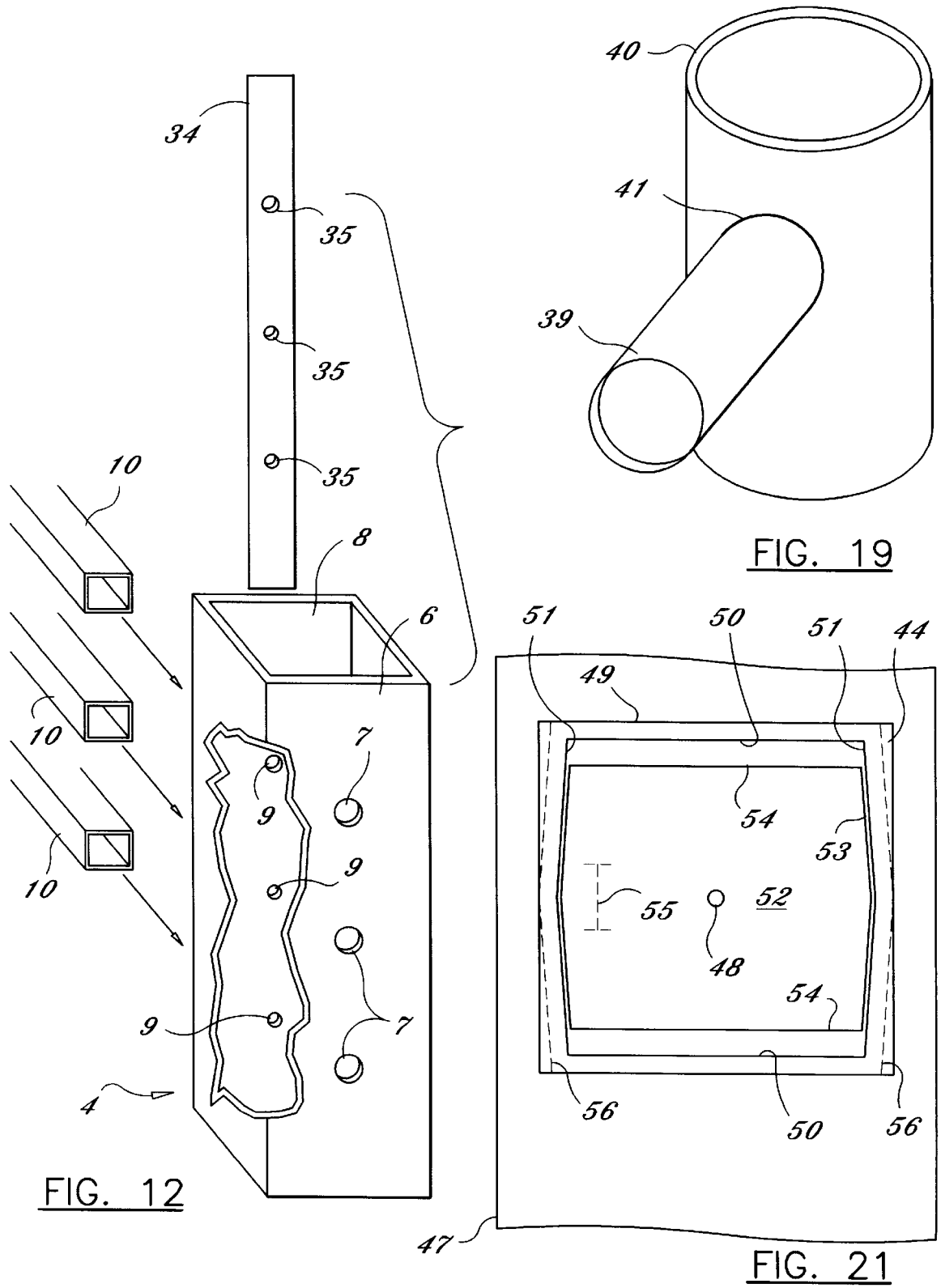

WEDGE PLUG TUBING CONNECTOR

BACKGROUND OF THE INVENTION

This invention relates to methods and apparatus for rigidly connecting one tubular member to the side of another tubular member, and more particularly to such connections that employ an internal wedging plug.

DESCRIPTION OF THE PRIOR ART

When framing members for diverse structures such as bookshelves, carts, screen rooms, and the like were made of wood, they employed solid members that required certain joining means. With the substitution of metal and plastic materials, hollow members could replace the solid wood with improved function and savings in cost and weight. However, they required the use of different connecting methods. Welding has been preferred for joining one hollow member to the side of another hollow member. However that method has serious limitations. The two members must be made of compatible materials. The heating may weaken the walls at the joint. The strength of the joint is limited to the wall thickness at this weakened area. As a consequence, failures generally occur at the joint. The designer will often select a greater wall thickness for the tubing than is required for structural strength to ensure a secure joint. This leads to increased weight and cost. One of the applicants has used a novel wedge type internal plug connector for joining one square tube to the side of another square tube, as shown in the prior art drawing FIGS. 2–5. The joint was difficult to align unless it was constructed to engage less of the structure. It also had poor lateral stability.

SUMMARY OF THE INVENTION

The instant invention comprises a wedge plug tubing connector for a joint that facilitates alignment, engages more of the structure, and provides more stability in all directions. It employs a distal wedge element and a proximal wedge element that cooperate with one another when a fastener draws them together. Specially shaped fastener channels keep the wedges aligned. Specially shaped wedge surfaces enable the wedges to engage more of the connecting tube to enhance stability in all directions.

These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is a perspective view of a welded connection of the prior art.

FIG. 2 is a vertical section of a wedge connection of the prior art.

FIG. 3 is a top view of the connection of FIG. 2 with tube ready for joining.

FIG. 4 is a perspective view of the two wedges of FIG. 2.

FIG. 5 is an end view of the wedges of FIG. 2.

FIG. 6 is a top view of a joint with a connector of the invention with the side member partially cut away.

FIG. 7 is a side view of the joint of FIG. 6 with the tube and side member in phantom.

FIG. 8 is an end view of the proximal wedge of FIG. 6.

FIG. 9 is an end view of the distal wedge of FIG. 6.

FIG. 12 is an exploded view, partially cut away, of another embodiment of the invention.

FIG. 19 is a perspective view of another embodiment of the invention with a cylindrical hollow member to which a cylindrical tube is joined.

FIG. 21 is an end view of another embodiment of the invention.

DETAILED DESCRIPTION OF PREFERRED EMBODIMENTS

Figure 10:
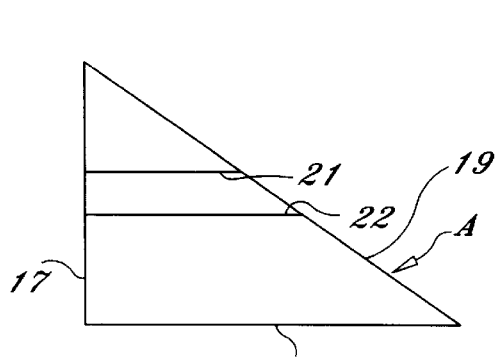
FIG. 10 is a sectional view taken on line 10—10 of FIG. 8.
Figure 11:
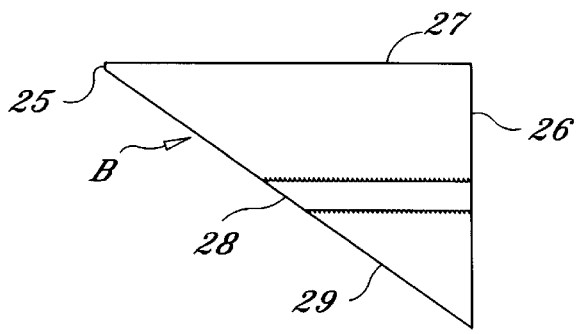
FIG. 11 is a sectional view taken on line 11—11 of FIG. 8.
Figure 13:
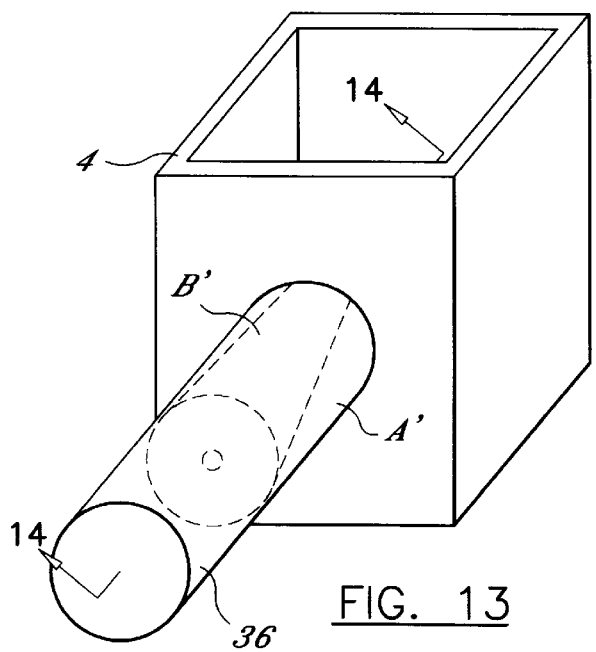
FIG. 13 is a perspective view of another embodiment of the invention.
Figure 14:
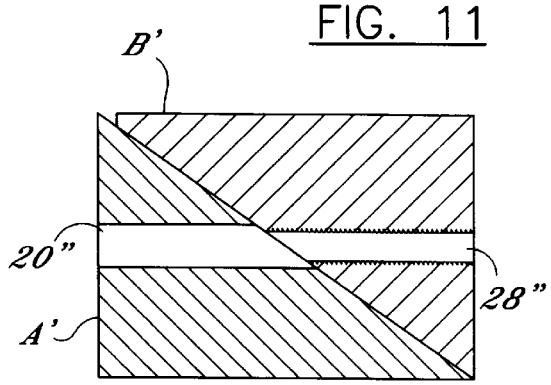
FIG. 14 is a sectional view taken on line 14—14 of FIG. 13.

Many constructions use hollow members, or tubes, for framework and the like because of their rigidity, light weight and low cost. It is common practice in the art, as shown in FIG. 1, to join one tube 10" at right angles to the side of a hollow member 4" by welding the parts together at the seam 100. It is difficult to produce a cosmetic joint, and the metal subjected to the heat may lose some of its strength. One must often use thicker walls than is required by the balance of the structure to compensate for this weakness. This method is even less useful with non-metallic tubes such as PVC pipe. These generally use bulky molded sleeve connections.

Many of these objections have been overcome by a wedge plug connection invention of one of the applicants, as shown in FIGS. 2–5 that constitutes prior art. Referring now to FIGS. 2–5, a square tube 10' with a long axis 11' has a first end 14' that is joined to the side of square hollow member 4'. A fastener 1' has a threaded shaft 2' and an enlarged head 3' with a hex socket. An aperture 7' in first wall 6' is large enough to pass the head 3', and aperture 9' in second wall 8' is just large enough to pass the shaft. A washer 33' supports the head. A pair of cooperating wedge elements, a proximal element 16' and a distal element 25', are mounted on the fastener outside of member 4' to fit into the end of tube 10', as shown in FIG. 3. The shaft 2' passes freely through channel 20' in the proximal element and threadedly engages the threaded channel 28' in the distal element 25'. When the tube 10' is fitted over the wedges and the fastener is rotated by a wrench through aperture 7', the distal wedge is pulled toward member 4'. The sloping faces 19' and 29' of the proximal and distal wedges cooperate to force the proximal wedge element downward relative to the distal wedge element until the upper face 27' of the distal element is tightly applied to the upper inner wall surface of the tube, the lower face 18' of the proximal element is tightly applied to the lower inner wall surface of the tube, and the edge 14' of the tube is tightly applied the outer surface of the member side wall. In order for the proximal wedge to move relative to the distal wedge, its channel 20' must be larger than the channel 28' in the distal wedge, as shown in FIG. 5, where the moved relative position 28" of the threaded channel is shown in phantom. The wedges were both cut from square section bar. A problem with this connector related to the large channel required in the proximal element. As shown in FIG. 3, the two wedge elements often are not aligned as they are to be inserted into the tube. For this reason it was necessary to fabricate the elements from a square bar considerably smaller than the inner dimensions of the tube so that even misaligned elements would fit into the tube. As a consequence, the full upper and lower surfaces of the tube were not used in the connection, leaving it weaker. Furthermore, there was little lateral strength to the joint, because the sides of the tube were not engaged.

New and improved joint connectors and methods for joining are provided by the instant invention that utilize more of the internal surface if the tube, eliminate misalignment of the elements, and provide enhanced lateral strength. Referring now first to FIGS. 6–11, a rectangular cross section tube 10 with a long axis 11 is joined at cut first end 14 to elongate rectangular cross section hollow member 4 having long axis 5 employing a wedge plug connector and method of the invention.

Fastener 1 has an enlarged hex socket head 3 and a threaded shaft 2. Member 4 has a first wall 6 with a first aperture 7 large enough to pass the head 3 and an opposed, second wall 8 with a second aperture 9 large enough to pass shaft 2. The joint is formed by first passing the fastener through the first wall aperture 7 and the shaft through second wall aperture 9. A washer 33 may further support the head, especially useful when member 4 is of soft thin wall material. A proximal wedge element A and a distal wedge element B are mounted on the shaft and fit inside end 14 of tube 10. They may be cut from bar stock having a cross section closely matching the internal dimensions of tube 10.

Element B has a first face 26, a second face 27, and a planar sloping face 29 substantially joining the other two faces, with the exception of a small portion 25 cut off to prevent that element from touching member 4. A threaded channel 28 passes through the element parallel to face 27.

Element A has a first face 17, a second face 18, and a planar sloping face 19 substantially joining the other two faces. First face 17 is configured planar to closely engage the joining surface 15 on second wall 8 to which it will be drawn up by rotation of the fastener. A non-threaded channel 20 passes through the element parallel to face 18. This channel has an unusual shape to enable the wedge to move up and down on the fastener shaft, but to restrict lateral movement, which was found to be such a problem with the prior art. The channel 20 has an upper wall 21 and an opposed, lower wall 22 that conform substantially to the outer surface of the shaft 2. These walls are spaced apart by a distance sufficiently great to enable the wedge to move freely on the shaft between a first position when the wedges are together for insertion into the tube and a second position when the wedges are spread apart enough to tightly engage the upper and lower inner walls of the tube. This distance is greater than the diameter of the shaft shown in phantom in FIG. 8. The width of the channel in the direction transverse to this spaced-apart distance is no greater than the shaft diameter. This ensures that the two elements will remain aligned on the fastener.

Referring now to FIG. 12, an embodiment of the invention is shown for joining three tubes 10 having rectangular cross sectional inner surfaces to a single hollow member 4. Apertures 7 in a first wall 6 are large enough to pass the heads of fasteners (not shown). Apertures 9 in second wall 8 allow passage of the shafts of the fasteners. Because it is difficult to position multiple washers in a long hollow member, a long strip of metal 34, preferably steel, is provided with appropriately punched holes 35 to provide the equivalent of multiple washers that is more easily positioned. At the same time, the steel strip provides further strength to the structure.

Figure 15:
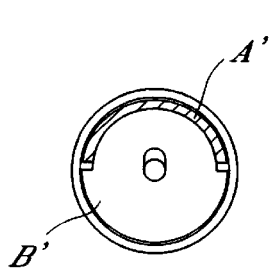
FIG. 15 is an end view of the joint of FIG. 13.
Figure 16:
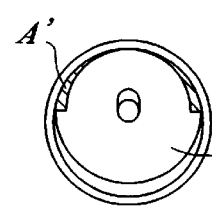
FIG. 16 is an end view of the joint of FIG. 13 before the wedge is tightened.
Figure 17:
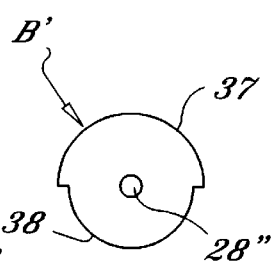
FIG. 17 is an end view of the distal wedge of FIG. 13.
Figure 18:
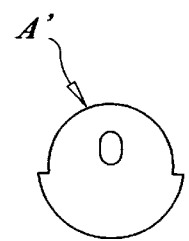
FIG. 18 is an end view of the proximal wedge of FIG. 13.

FIGS. 13–18 show another embodiment of the invention for joining a cylindrical tube 36 to the rectangular hollow member 4. The proximal wedge element A' and distal wedge element B' are cut from elongate extruded bars having the cross sections shown in FIGS. 18 and 17 respectively. Distal wedge channel 28" is then threaded. Proximal channel 20" is configured as shown for proximal wedge element A. The bar stocks from which these elements are cut, as exemplified by FIG. 17 for element B', have a first cylindrical surface 37 with a radius closely corresponding to the radius of the inner surface of the tube and a second cylindrical surface 38 of a lesser radius. Surface 37 does not extend to the diameter to enable the wedges to fit into the tube before the fastener is tightened, as shown in FIG. 16, and to tightly grip almost the entire inner surface of the tube as shown in FIG. 15 when the fastener is tightened. This provides great lateral as well as vertical strength to the joint. Channel 28" is not at the center of the cylindrical surface 37. An eccentric channel ensures that the element cannot spin in the tube when the fastener is tightened.

Figure 20:
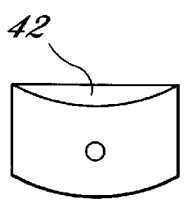
FIG. 20 is a perspective view of a washer for use with the joint of FIG. 19.

Referring now to FIGS. 19 and 20, another embodiment is shown in which a cylindrical tube 39 is joined to a cylindrical hollow member 40. The end 41 of tube 39 is cut to match the wall of member 40, and a special washer 42 is provided to match the inner wall surface of member 40.

Referring now to FIG. 21, other embodiment of the invention for joining together two substantially rectangular tubes that ensures greater strength in all directions is shown. The view is an end view from the distal end of the wedge 52 before the fastener 48 is tightened. Tube 44 is to be joined to the side of vertical member 47. Tube 44 has a rectangular outer surface 49, and the inner surface has two parallel, opposed flat faces 50 joined by sloping sides 51, which extend away from the flat faces at an angle of greater than ninety degrees. The distal end of distal wedge element 52 is seen. It has two parallel, opposed flat faces 54 joined by sloping sides 53. The sloping sides are shorter than those of the tube inner surface as shown. The other dimensions of the inner surface correspond closely to those of the two wedges. This enables the two wedges to be inserted into the tube before tightening the fastener, and to have one of the wedges firmly engage the upper half of the tube and the other wedge engage the other half of the tube when the fastener is tightened. Only the length 55 on the tube inner surface is not engaged by the wedges. As shown by the phantom lines 56, the outer surface of the tube may be extruded with uniform walls if desired.

A distinct advantage of the invention is the ability to disconnect the joint by simply unscrewing the fastener.

The invention disclosed above has a number of particular features, which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A joint comprising:
   a) a fastener having an elongate threaded shaft and an enlarged head;
   b) a hollow member with a long axis, a first wall having a first aperture therethrough dimensioned to pass said head, a second opposed wall having a second aperture therethrough aligned with said first aperture and dimensioned to pass said shaft;
   c) a tube having a long axis, an inner wall surface with a uniform non-rectangular cross section, and a first end for joining to the hollow member at an outer joining surface thereof containing said second aperture;
   d) a proximal wedge element having: a first surface constructed to securely engage said outer joining surface; a second surface connected to the first surface and extending perpendicular to the first surface and being configured to substantially correspond to a less than half portion of said inner wall surface; and a third, planar surface connecting said first and second surfaces; a channel extending through the element perpendicular to the first surface, the channel having first and second opposed walls closely corresponding to the shaft dimensions and spaced apart in a direction parallel to the first surface by a first distance that is sufficiently greater than the shaft diameter to permit movement of the proximal wedge element relative to the shaft in that direction only;
   e) a distal wedge element having: a first surface; a second surface connected to the first surface and being configured to substantially correspond to a less than half portion of said inner wall surface; a channel extending through the element parallel to the second surface and threaded to receive said shaft; and a third, planar surface connecting said first and second surfaces;
   f) said third surfaces of said proximal and distal wedge elements constructed to slide against one another to cause said second surfaces to move between: a first position in which the second surfaces are spaced apart from one another closely enough to enable the two wedge elements free insertion into the first end of the tube when the fastener passes through said joining surface, through said proximal wedge element and threadedly engages said distal wedge element; and a second position in which the fastener is advanced into the distal wedge element sufficiently to cause the second surfaces to move apart to securely engage a greater than half portion of the inner wall surface of the tube and draw the tube tightly against said outer joining surface of the hollow member;
   g) the channel in the proximal wedge element being so constructed and arranged to permit movement of the second surface in a first direction away from the shaft as the fastener is advanced into the distal wedge element, while restricting movement of the proximal wedge element in a second direction transverse to the first direction; and
   h) the second surfaces of the proximal and distal wedge elements being arranged to intimately contact the inner wall surface in both the first and second directions when in the second position for improved joining security.

2. The joint according to claim 1 further comprising a washer means interposed between the head of the fastener and the second wall of the member having an aperture great enough to pass the shaft and small enough to resist passage of the head for extending the area of the second wall bearing the forces of the connection.

3. The joint according to claim 2 further comprising a plurality of said tubes joined to a common hollow member by said wedge elements, and in which the washer means comprises an elongate single strip with a plurality of apertures for receiving a fastener for each tube.

4. The joint according to claim 1 in which the tube has a generally curvilinear cross-sectional inner wall surface, each of said second surfaces is correspondingly curvilinear and engages less than 180 degrees of said inner wall surface, and the combined two second surfaces engage more than 180 degrees of said inner wall surface in the second position; and the channel in the proximal wedge element is positioned beyond the radius of the curvilinear second surface.

5. The joint according to claim 1 in which the tube inner wall surface comprises two parallel flat faces spaced apart by sides which extend from the flat faces at angles greater than ninety degrees.

6. The joint according to claim 1 in which the second opposed wall of the hollow member is planar.

7. The joint according to claim 1 in which the second opposed wall of the hollow member is generally cylindrical.

8. A wedge plug connector for joining an elongate tube to the side of an elongate hollow member, the tube having a uniform, non-rectangular cross-sectional inner wall surface, and an end for joining to an outer wall of the hollow member at an outer joining surface of the member that has an aperture therethrough, the connector comprising:
   a) a fastener having an elongate threaded shaft dimensioned to pass through the aperture and an enlarged head;
   b) a proximal wedge element having: a first surface constructed to securely engage said outer joining surface; a second, non-planar surface connected to the first surface and extending perpendicular to the first surface and being configured to substantially correspond to a less than half portion of said inner wall surface; and a third, planar surface connecting said first and second surfaces; and a first channel extending through the element perpendicular to the first surface;
   c) a distal wedge element having: a first surface; a second, non-planar surface connected to the first surface and being configured to substantially correspond to a lees than half portion of said inner wall surface; a second channel, being smaller in diameter than the first channel, extending through the element parallel to the second surface and threaded to receive said shaft; and a third, planar surface connecting said first and second surfaces; and
   d) said third surfaces of said proximal and distal wedge elements constructed to slide against one another to cause said second surfaces to move between; a first position in which the second surfaces are spaced apart from one another closely enough to enable the two wedge elements free insertion into the first end of the tube when the fastener passes through said joining surface, through said proximal wedge element and threadedly engages said distal wedge element; and a second position in which the fastener is advanced into the distal wedge element sufficiently to cause the second surfaces to move apart in a first direction to securely and intimately engage a greater than half portion of the inner wall surface of the tube in both the first direction and in a second direction transverse to the first direction and to draw the tube tightly against said outer joining surface of the hollow member, said first channel being dimensioned to enable the proximal wedge element to move freely between said first and second positions.

9. The connector according to claim 8 further comprising a washer means interposed between the head of the fastener and the inner surface of the wall of the member, the washer means having an aperture great enough to pass the shaft and small enough to resist passage of the head for extending the area of the wall bearing the forces of the connection.

10. The connector according to claim 9 for joining a plurality of tubes to a common hollow member by a plurality of fasteners and wedge elements, and in which the washer means comprises an elongate single strip with a plurality of apertures for receiving a fastener for each tube.

11. The connector according to claim 8 in which the tube has a circular cross-sectional inner surface.

12. The connector according to claim 8 in which the tube inner wall surface comprises two parallel flat faces spaced apart by sides which extend from the flat faces at angles greater than ninety degrees.

13. The connector according to claim 8 in which the second opposed wall of the hollow member is planar.

14. The connector according to claim 8 in which the second opposed wall of the hollow member is generally cylindrical.

15. A joint comprising:
  a) a fastener having an elongate threaded shaft and an enlarged head;
  b) a hollow member with a long axis, a first wall having a first aperture therethrough dimensioned to pass said head, a second opposed wall having a second aperture therethrough aligned with said first aperture and dimensioned to pass said shaft;
  c) a tube having a long axis, a passage therethrough, the passage having a uniform, non-rectangular cross-sectional inner wall surface, and a first end for joining to the hollow member at an outer joining surface thereof containing said second aperture;
  d) a proximal wedge element having: a first surface constructed to securely engage said outer joining surface; a second surface connected to the first surface and extending perpendicular to the first surface and being configured to substantially correspond to a less than half portion of said inner wall surface; and a third, planar surface connecting said first and second surfaces; a channel extending through the element perpendicular to the first surface, the channel permitting movement of the proximal wedge element relative to the shaft;
  e) a distal wedge element having: a first surface; a second surface connected to the first surface and being configured to substantially correspond to a less than half portion of said inner wall surface; a channel extending through the element parallel to the second surface and threaded to receive said shaft; and a third, planar surface connecting said first and second surfaces; and
  f) said third surfaces of said proximal and distal wedge elements constructed to slide against one another to cause said second surfaces to move between: a first position in which the second surfaces are spaced apart from one another closely enough to enable the two wedge elements free insertion into the first end of the tube when the fastener passes through said joining surface, through said proximal wedge element and threadedly engages said distal wedge element; and a second position in which the fastener is advanced into the distal wedge element sufficiently to cause the second surfaces to move apart to securely engage in combination a greater than half portion of the cross-sectional inner surface of the tube and draw the tube tightly against said outer joining surface of the hollow member.

16. The joint according to claim 15 further comprising a washer means interposed between the head of the fastener and the inner surface of the wall of the member, the washer means having an aperture great enough to pass the shaft and small enough to resist passage of the head for extending the area of the wall bearing the forces of the connection.

17. The joint according to claim 16 for joining a plurality of tubes to a common hollow member by a plurality of fasteners and wedge elements, and in which the washer means comprises an elongate single strip with a plurality of apertures for receiving a fastener for each tube.

18. The joint according to claim 15 in which the tube has a circular cross-sectional inner surface.

19. The joint according to claim 15 in which the tube has a cross-sectional inner surface comprising two parallel flat faces spaced apart by sides, which extend away from the flat faces at angles greater than ninety degrees.

20. The joint according to claim 15 in which the second opposed wall of the hollow member is planar.

21. The joint according to claim 15 in which the second opposed wall of the hollow member is generally cylindrical.

* * * * *